(12) United States Patent
Hödlmoser et al.

(10) Patent No.: US 11,912,216 B2
(45) Date of Patent: Feb. 27, 2024

(54) METHOD AND DEVICE FOR ADJUSTING OR CONTROLLING A VEHICLE COMPONENT

(71) Applicant: emotion3D GmbH, Vienna (AT)

(72) Inventors: Michael Hödlmoser, Schörfling (AT); Florian Seitner, Vienna (AT); Sebastian Beyer, Vienna (AT)

(73) Assignee: emotion3D GmbH, Vienna (AT)

( * ) Notice: Subject to any disclaimer, the term of this patent is extended or adjusted under 35 U.S.C. 154(b) by 0 days.

(21) Appl. No.: 17/908,572

(22) PCT Filed: Jan. 27, 2021

(86) PCT No.: PCT/EP2021/051825
§ 371 (c)(1),
(2) Date: Sep. 1, 2022

(87) PCT Pub. No.: WO2021/175516
PCT Pub. Date: Sep. 10, 2021

(65) Prior Publication Data
US 2023/0120314 A1    Apr. 20, 2023

(30) Foreign Application Priority Data
Mar. 2, 2020 (AT) ................. A50153/2020

(51) Int. Cl.
*B60R 16/037* (2006.01)
*G06V 20/59* (2022.01)
*G06F 3/01* (2006.01)

(52) U.S. Cl.
CPC ............ *B60R 16/037* (2013.01); *G06F 3/012* (2013.01); *G06V 20/59* (2022.01)

(58) Field of Classification Search
CPC ....... B60R 16/037; G06F 3/012; G06V 20/59; G06V 20/597; B60N 2/002; B60W 50/10; E05F 15/73
See application file for complete search history.

(56) References Cited

U.S. PATENT DOCUMENTS

2003/0116698 A1    6/2003  Hayashi et al.
2019/0375312 A1*  12/2019  Petersson .......... B60R 21/01552
(Continued)

FOREIGN PATENT DOCUMENTS

CN     110466458     11/2019
DE    102012020855    4/2014
(Continued)

OTHER PUBLICATIONS

Vamsi, Malneedi, K. P. Soman, and K. Guruvayurappan. "Automatic seat adjustment using face recognition." 2020 International Conference on Inventive Computation Technologies (ICICT). IEEE, 2020. (Year: 2020).*
(Continued)

*Primary Examiner* — Russell Frejd
*Assistant Examiner* — Ana D Thomas

(57) ABSTRACT

A method for adjusting or controlling at least one actuator in a vehicle (1), for example an electrical servo motor (2) for a seat (3), a tripping mechanism of an airbag (4), or a display device (5) in the vehicle (1), comprising the following steps: capturing an image or a video of a preferably sitting person in the vehicle (1) through an image capturing unit (6) in 2D or 3D arranged in the vehicle (1), extracting the body data of the person through a data processing unit (7) and generation of a body data model (8) from the body data through a data processing unit (7), comparing the body data model (8) with a plurality of reference body poses (11) obtained from a database (10) through a comparator unit (9) and selecting a corresponding reference body pose (11), activat-
(Continued)

ing an actuator assigned to the selected reference body pose (11) with a setting of the actuator assigned to the selected reference body pose (11) through an activation unit (12).

17 Claims, 2 Drawing Sheets

(56) References Cited

U.S. PATENT DOCUMENTS

| | | | | |
|---|---|---|---|---|
| 2021/0118170 A1* | 4/2021 | Fujii | ............... | G06T 7/73 |
| 2021/0150754 A1* | 5/2021 | Tanaka | ............... | G06T 7/73 |
| 2023/0109225 A1 | 4/2023 | Hodlmoser et al. | | |

FOREIGN PATENT DOCUMENTS

| | | | | |
|---|---|---|---|---|
| DE | 102018210028 | 12/2019 | | |
| DE | 102018210902 | 1/2020 | | |
| EP | 2952661 | 12/2015 | | |
| EP | 2957193 A1 * | 12/2015 | ............ | A47C 1/00 |
| EP | 3581440 | 12/2019 | | |

OTHER PUBLICATIONS

Cheng, Shinko Y., and Mohan M. Trivedi. "Human posture estimation using voxel data for" smart" airbag systems: issues and framework." IEEE Intelligent Vehicles Symposium, 2004. IEEE, 2004. (Year: 2004).*
Gupta, Rajeev, et al. "Posture recognition for safe driving." 2015 Third International Conference on Image Information Processing (ICIIP). IEEE, 2015. (Year: 2015).*
Internationaler Recherchenbericht und Schriftlicher Bescheid [International Search Report and the Written Opinion] dated Apr. 8, 2021 From the International Searching Authority Re. Application No. PCT/EP2021/051825 and Its Translation of Search Report Into English. (13 Pages).
Internationaler Vorläufiger Bericht zur Patentierbarkeit [International Preliminary Report on Patentability] dated May 27, 2022 From the International Preliminary Examining Authority Re. Application No. PCT/EP2021/051825. (23 Pages).
International Preliminary Report on Patentability dated May 27, 2022 From the International Preliminary Examining Authority Re. Application No. PCT/EP2021/051825. (5 Pages).

* cited by examiner

Fig.4
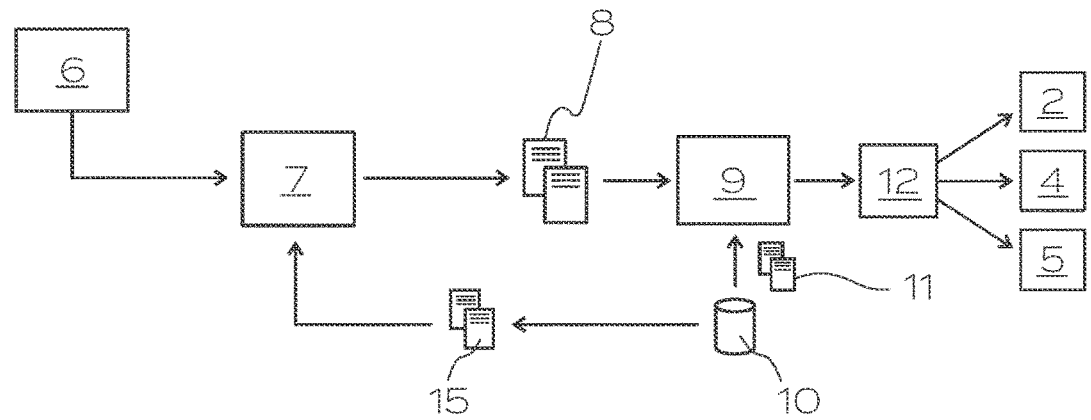
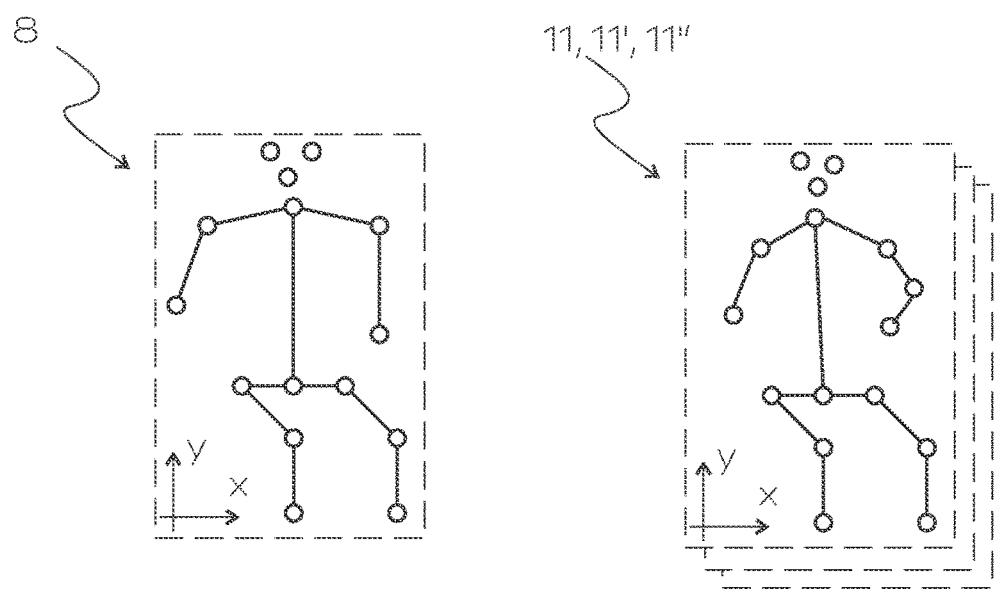
Fig. 5

METHOD AND DEVICE FOR ADJUSTING OR CONTROLLING A VEHICLE COMPONENT

RELATED APPLICATIONS

This application is a National Phase of PCT Patent Application No. PCT/EP2021/051825 having International filing date of Jan. 27, 2021, which claims the benefit of priority of Austrian Patent Application No. A50153/2020 filed on Mar. 2, 2020. The contents of the above applications are all incorporated by reference as if fully set forth herein in their entirety.

FIELD AND BACKGROUND OF THE INVENTION

The invention concerns a method and a device for intelligent adjustment and control of one or more vehicle components.

Vehicles have a plurality of different components, which can be adjusted or controlled by the passenger through input commands. For example, seats can be pushed or tilted forwards, backwards, upwards or downwards in a defined range, as well as adjusted to fixed positions. Side mirrors can be tilted or folded in. Displays can also be tilted or show different content depending on the input command of the passenger. The steering wheel can be adjusted to the size of the driver when entering the vehicle by an input command from the driver, signals and inscriptions can change their appearance on command, and the airbags can be deactivated on a command from the driver. The terms "adjusting" and "controlling" may refer to the adoption of a predefined position, but also to a continuous movement of the vehicle component.

SUMMARY OF THE INVENTION

Manual input commands for controlling vehicle components are known from the prior art, for example with switches or touch sensitive screens. Furthermore, it is known from the prior art to control vehicle components with hand gestures, wherein devices for gesture detection, in particular depth cameras, are provided.

However, the passenger has to memorize a series of hand gestures, for example, to be able to push his seat forwards or backwards using the appropriate hand gesture.

In practice, however, the problem arises that the hand gestures used are unnatural, since they are not directly related to the action triggered by the hand gestures.

It is an object of the present invention to provide a method and a device with which passengers may adjust and control specific vehicle components particularly easily and intuitively.

According to the invention, this object is solved by a device and a method according to the independent patent claims.

A method according to the invention for adjusting or controlling at least one vehicle component in a vehicle comprises several steps.

First, an image or a video of a preferably sitting person in the vehicle is captured through an image capturing unit in 2D or 3D arranged in the vehicle. The person may be the driver or a passenger of the vehicle. The image capturing unit may be a camera, in particular also a depth camera. The captured image or video is transmitted to a data processing unit.

The data processing unit extracts the body data of the person, from which it generates a body data model. This extraction is performed, for example, through conventional image processing routines, through comparison with reference body images previously stored in a database, or by using a neural network previously trained with training data, which may be part of the data processing unit.

Instead of a neuronal network, other machine learning classification methods may also be provided according to the invention, for example decision trees or Random Forests, which may be implemented as part of the data processing unit. According to the invention, a special design of the seat or special clothing is not required for extracting the body data.

The body data may refer to positions of defined key points, such as wrist joints, arm joints, sternum, shoulder joints, knee joints, elbow joints, hip joints, or head centre points, as well as measurements between these positions, such as shoulder width, pelvis width, neck length, upper arm length, lower arm length, thigh length, and the like. The respective body data model may be implemented, for example, in form of a table with two-dimensional coordinates of the key points of the body, a graph with connecting lines between the recognized key points, or any other appropriate data structure in the data processing unit.

In a next step, a comparator unit compares the body data model with a plurality of reference body poses obtained from a database. The comparator unit may be connected with the database via an interface. This may be an external database on a server on the Internet, or an internal database in the vehicle.

In this context, the term body pose refers to a body posture that results from body data, i.e. a determined arrangement and position of defined key points of the body and their spatial position in relation to each other. For example, a "relaxed", a "tense", an "upwards looking" or "sideways looking" body pose and many other body poses may be defined as reference body poses in the database.

The reference body poses may be created in the database in preparation for the method according to the invention by classifying different individuals in a variety of images and with variability in terms of their body pose, clothing, lighting, and other criteria. The joint positions of these persons are known, so that the reference body poses can be saved in a simple way as a data model in the database. Like the body data models, the reference body poses may be implemented, for example, in form of a table with two-dimensional coordinates of the key points of the body, a graph with connecting lines between the recognized key points, or any other appropriate data structure in the data processing unit.

As a result of the comparison, the comparator unit selects a reference body pose that best matches the current body data model.

According to the invention, the reference body poses in the database are each assigned to at least one actuator, and to at least one setting or a specific action of this actuator. The actuator may be any adjustable, i.e. influenceable, vehicle component. The assigned setting may be a predefined setting, it also may be assigned to a determined ongoing action of the actuator, for example, a continuous movement such as "move forwards", "swing to the right", a continuous adjustment of the vehicle component such as "get brighter", "dim", "get louder", "get quieter", or the like.

For example, it may be an electrical servo motor for a seat, a tripping mechanism of an airbag, or a display device in the dashboard of the vehicle. An interior mirror, an exterior mirror, or a steering wheel may also be an actuator that is adjustable according to the invention.

In a further step, an activation unit activates the actuator that is assigned to the selected reference body pose and with that setting of the actuator, which is assigned to the selected reference body pose.

According to the invention, reference body poses may be defined, which for example, move the seat forwards, backwards, upwards, or downwards. Reference body poses may be defined in order to arbitrarily align or change the appearance of any vehicle component.

In this context, the poses may trigger continuous movements of vehicle parts (e.g. seats that move forwards and backwards), but also trigger the approach of discrete positions (e.g. steering wheel in a previously defined position) and cause their appearance to change (e.g. different content on displays, or elements that can be switched on or off, etc.).

Actions of several vehicle parts may also be combined (e.g., the simultaneous alignment of the steering wheel and seat while assuming corresponding body poses).

According to the invention, it may be provided that the reference body poses are established by conducting tests with test subjects in advance, observing which body poses the test subjects usually assume before performing certain settings of the actuators. For example, a stretched body posture may indicate a need to adjust the interior mirror, or a head turned sideways to the upper left or right may indicate that an exterior mirror is not properly adjusted.

The detected reference body poses may be saved in a database.

By way of example, reference body poses may be defined as follows:
(a) "leaning forwards": As soon as the upper body is tilted forwards, the seat moves forwards, the triggering power of the airbag is reduced accordingly, lights on the steering wheel are dimmed, displays change their content.
(b) "leaning backwards": As soon as the upper body is tilted backwards, the seat moves backwards, the triggering power of the airbag is increased accordingly, lights on the steering wheel are brightened, displays change their content.
(c) "chill pose": As soon as the "chill pose", a particularly relaxed body posture, is assumed, vehicle components assume corresponding and previously defined states (e.g. the seat moves in a fixed supine position).

This comparison according to the invention with predefined reference body poses for the adjustment and adaptation of vehicle components allows an extraordinarily intuitive handling of the system. This eliminates the need to perform unusual hand gestures to move a seat forwards/backwards/upwards/downwards, for example. In addition, body poses may be directly linked to actions and adaptations, resulting in a completely new form of intuitive interaction between the people in the vehicle and the vehicle components.

According to the invention, it may thus be provided that a plurality of defined reference body poses are previously saved in a database, wherein each reference body pose is linked to at least one actuator and at least one setting of that actuator.

However, it may also be provided that a reference body pose is combined with a plurality of actuators, wherein a defined setting is provided for each actuator. Furthermore, it may be provided that the activation unit checks the current setting of the actuator before activating it, and activates it only when necessary.

However, the method according to the invention is not limited to body postures. It may also be provided that the data processing unit generates a face data model from which it extracts the line of vision or the head orientation of the person. The detected line of vision or head orientation may be taken into account by the data processing unit when selecting the reference body pose. The detected line of vision or head orientation may be also taken into account by the activation unit when activating the actuator.

The body data model may also be implemented in form of a table with two-dimensional coordinates of the key points of the face (e.g. eyes, ears, nose), a graph with connecting lines between the recognized key points, or any other data structure in the data processing unit.

According to the invention, the comparison of the body data model with the reference body poses and the selection of the corresponding reference body pose may be performed by the comparator unit applying a matching algorithm or a machine learning classification method.

In particular, the comparator unit may deploy a neural network trained with reference body images. The comparator unit may preferably be part of the data processing unit.

However, the comparator unit applying predetermined heuristics may also carry out the comparison and the selection. For example, the comparison of the body data model with the reference body poses and the selection of the corresponding reference body pose may be performed by the comparator unit determining spatial body parameters of the body data model, e.g. shoulder width, torso length, and the arrangement of the shoulder joints of the person, upper arms, lower arms, and pelvis. The comparator unit then applies predetermined heuristics to the body parameters in order to select one of the reference body poses, for example the angle between the detected upper arms and lower arms of the person.

The invention further comprises a computer-readable storage medium with instructions that cause a data processing unit to perform a method according to the invention.

The invention also extends to a device for adjusting an actuator in a vehicle, comprising a 2D or 3D image capturing unit arranged in the vehicle and designed to capture an image or a video of a preferably seated person in the vehicle.

The device according to the invention further comprises a data processing unit designed to extract the body data of the person and to generate a body data model from the body data, a comparator unit designed to compare the body data model with a plurality of reference body poses obtained from a database and to select a corresponding reference body pose, and an activation unit designed to activate an actuator assigned to the selected reference body pose with a setting of the actuator assigned to the selected reference body pose.

In particular, the image capturing unit may be designed as a camera. The camera may be arranged, for example, in the dashboard or in the area of the rear view mirror, wind shield, or roof of the vehicle.

According to the invention, it may be provided that the data processing unit is also designed to generate a face data model from which to extract the line of vision of the person or head orientation, and to take into account the detected line of vision or head orientation when selecting the reference body pose. The activation unit may also be designed to take into account the detected line of vision or head orientation when activating the actuator.

The device may be partially, but preferably entirely, arranged in a vehicle.

However, it may also be provided that the data processing unit and the comparator unit are arranged in the vehicle and communicate via an interface, for example a wireless connection, with an external server, for example a server on the Internet, on which a database with reference data patterns previously stored and/or continuously supplemented may be provided.

The image capture unit may be a ToF (time-of-flight) camera that is designed to capture a 3D depth image. This facilitates robust extraction of body data.

The image capturing unit is preferably arranged in the vehicle in such a way that the objects to be analysed, i.e. the seated person, are visible in the captured image. To extract body data, image analysis libraries in a database and/or a detector trained with training examples, for example a neural network may be used.

The data processing unit may be designed as a micro controller or a micro computer and comprise a central processing unit (CPU), a volatile semiconductor memory (RAM), a non-volatile semiconductor memory (ROM, SSD hard disk), a magnetic memory (hard disk) and/or an optical memory (CD-ROM) as well as interface units (Ethernet, USB) and the like.

The components of such data processing units are generally known to the skilled person. The comparator unit may be provided as a separate hardware unit, or preferably as a software module in the RAM or ROM of the data processing unit. The database may be provided as a software module in the data processing unit or in an external server. The database may contain training data, for example information about the physique of typical individuals (joint positions, height, circumferences, etc.).

The comparator unit may be designed to apply a matching algorithm or a machine learning classification method, in particular a neuronal network trained through reference body images, in order to compare the body data model to the reference body poses and in order to select a corresponding reference body pose. The classification method may be part of the data processing unit.

For example, the comparator unit may be designed to determine spatial body parameters of the body data model, e.g. shoulder width, torso length, and the arrangement of the shoulder joints, upper arms, lower arms, and pelvis of the person, when comparing the body data model to the reference body poses and when selecting the corresponding reference body pose.

The comparator unit may be further designed to apply predetermined heuristics in order to select one of the reference body poses, for example, the angle between the detected upper arms and lower arms of the person.

Further features according to the invention result from the claims, the exemplary embodiments and the figures.

BRIEF DESCRIPTION OF THE SEVERAL VIEWS OF THE DRAWINGS

In the following, the invention is explained by means of an exemplary, non-exclusive embodiment.

FIG. 4 shows a schematic view of the data flow in one embodiment of the method according to the invention;

FIG. 5 shows a schematic view of a body data model and the comparison with reference body poses.

DESCRIPTION OF SPECIFIC EMBODIMENTS OF THE INVENTION

Figure 1:
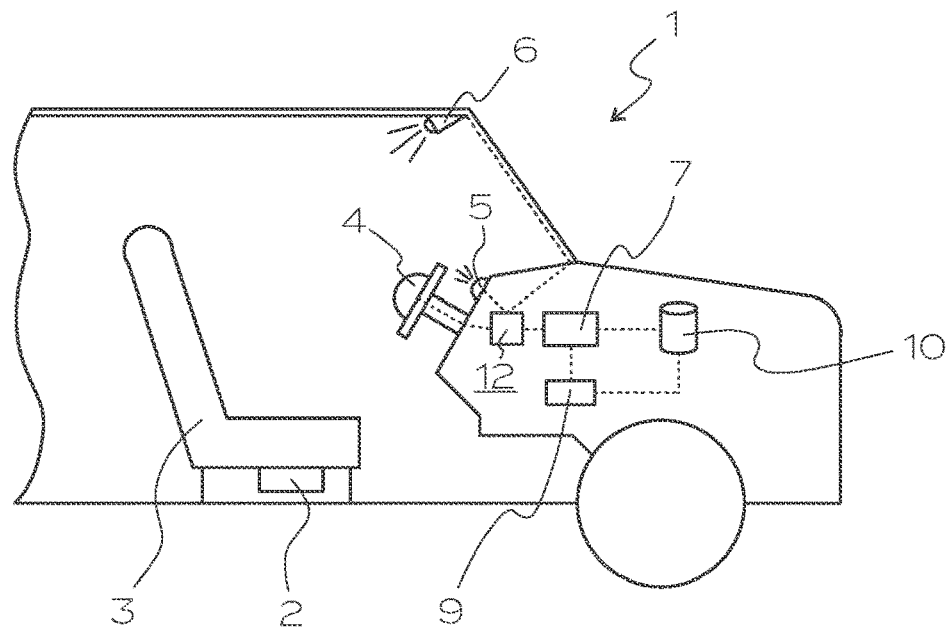
FIG. 1 shows a schematic view of an embodiment of a device according to the invention in a vehicle.

FIG. 1 shows a schematic view of an embodiment of a device according to the invention in a vehicle 1. In the interior of the vehicle 1 there is a seat 3 with an electric servomotor 2 for a person (not shown). An image capturing unit 6 is provided in the form of a camera and arranged centrally above the driver on the roof of the vehicle interior, the camera being aligned in such a way that it captures most of the person sitting at the seat 3. Furthermore, the vehicle 1 contains a data processing unit 7, a comparator unit 9 connected thereto in the form of a software module and an activation unit 12 also connected thereto.

Via an internal database 10, the data processing unit 7 and the comparator unit 9 are connected in this exemplary embodiment. For example, the activation unit 12 is connected via a field bus to a plurality of actuators in the vehicle, such as an airbag 4 and an display device 5 in the form of a lamp or an electronic display on a dashboard display. Furthermore, the activation unit 12 is also connected to the servo motor 2 for the seat 3.

Figure 2A:
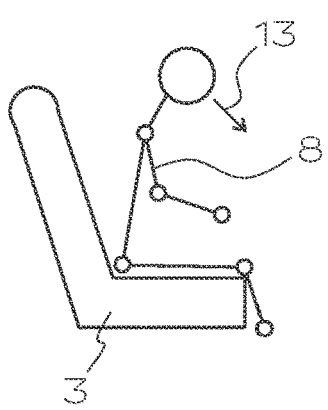
FIGS. 2a-2c show schematic views of different detected body data models.
Figure 2B:
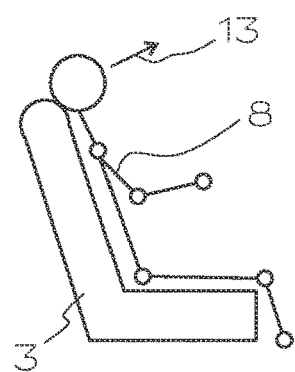
Figure 2C:
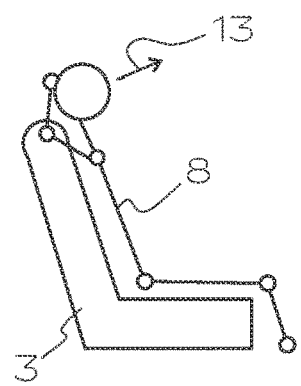

FIGS. 2a-2c show schematic side views of the body data models 8 of a person sitting in a seat 3 created by one embodiment of the device according to the invention from the side. The person is shown schematically, the detected line of vision of the person 13 is also shown. FIG. 2a corresponds to a strained body pose, FIG. 2b to a normal body pose looking at the rear view mirror of the vehicle, and FIG. 2c to a relaxed body pose.

Figure 3A:
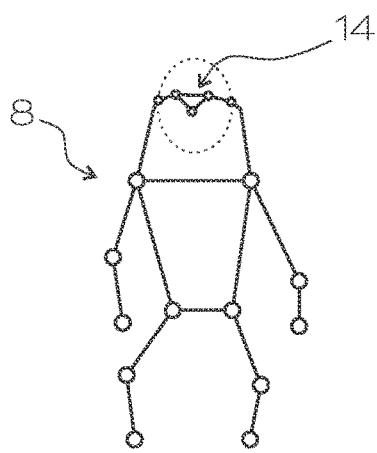
FIGS. 3a-3b show further schematic views of different detected body data models.
Figure 3B:
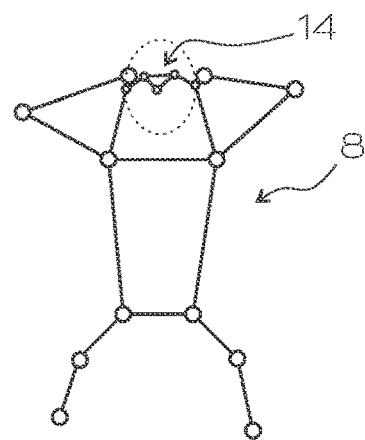

FIGS. 3a-3b show further schematic front views of the body data models 8 of a person sitting in a seat 3 created by one embodiment of the device according to the invention. Also shown here is a representation of a face data model 14, which comprises the position of eyes, nose, and ears. From the face data model 14 the line of vision and the head orientation of the person may be detected. FIG. 3a corresponds to a normal body pose, FIG. 3b to a relaxed body pose.

In the exemplary embodiments, the comparator unit 9 detects the body pose according to FIGS. 2a-2c by querying an internal neural network trained with reference data. Whereas, in the exemplary embodiments according to FIGS. 3a-3b, the comparator unit 9 detects the body pose by means of a predefined heuristic, for example that the angle between both upper arms and both lower arms of the person respectively falls below a value of 60°, and the lower legs do not point towards each other and are also not parallel.

FIG. 4 shows a schematic view of the data flow in one embodiment of the method according to the invention. The image capturing unit 6 provides photographs and/or videos of the seat 3 with the person to the data processing unit 7. The data processing unit extracts body data of the person from the photographs. The data processing unit may use image recognition algorithms or an internal or external detector previously trained with training examples, for example a neuronal network. This detector is part of the data processing unit 7.

In the present exemplary embodiment the data processing unit 7 compares the captured photographs and/or videos with reference body images 15 of previously recorded persons stored on a database 10 in order to extract body data of the person.

The data processing unit 7 generates from the body data of a person a body data model 8 in the form of a table of points in a coordinate system or in the form of a graph, i.e. point clouds connected by lines (edges). This has the advantage that less storage space and computing effort is required for the subsequent operations than if the photographs were used directly in sequence.

In order to generate the body data model 8, the data processing unit 7 in embodiments of the invention is designed to recognise predetermined key points in the photographs or videos of the person. For example, the key points are the positions of the eyes, nose, shoulders, elbows, wrists, hips, and/or knees of the person.

The positions of these key points are preferably stored in a two-dimensional coordinate system in order to form the body data model 8. The body data model 8 may, for example, have the following structure with a resolution of the input image of 766×612 pixels, whereby coordinates do not necessarily have to exist for all key points:

| body data model | | |
| --- | --- | --- |
| key point | x-coordinate | y-coordinate |
| eye right | 328 | 141 |
| eye left | 360 | 146 |
| ear right | ... | ... |
| ear left | ... | ... |
| nose | 340 | 142 |
| shoulder right | 362 | 98 |
| shoulder left | 285 | 75 |
| elbow right | ... | ... |
| elbow left | 243 | 43 |
| wrist joint right | ... | ... |
| wrist joint left | ... | ... |
| hip right | ... | ... |
| hip left | ... | ... |
| knee right | ... | ... |
| knee left | ... | ... |

In addition to the coordinate values of the points, connections of the points to form a graph may also be stored.

In further embodiments of the invention, the key points of the body data model 8 may also be stored in a three-dimensional coordinate system. In particular, this allows improved processing during subsequent comparison with the reference body poses.

In order to generate the body data model 8 or to recognise key points, various methods may be used. In the present embodiment, the estimation of 2D coordinates of the key points is carried out by a neuronal network that performs a direct comparison of the captured camera images with previously stored reference images in two-dimensional space.

In addition, depth data recorded by a depth camera (TOF camera) in parallel to the regular 2D camera may be used to estimate three-dimensional coordinates of the key points. However, 3D coordinates may also be recorded directly by a 3D camera system, wherein the estimation of the 3D key points is then carried out by a neuronal network, which performs a direct comparison of the captured camera images with stored reference images in 3D space.

FIG. 5 shows an example of a graphical representation of a body data model 8 in a two-dimensional coordinate system and the comparison with a plurality of 2D reference body poses 11, 11', 11" previously stored in the database 10. The reference body pose may be classified according to the poses mentioned above ("leaning forwards", "leaning backwards", "chill pose").

The point clouds or graphs of the body data model 8 are transmitted to a comparator unit 9. The comparator unit 9 compares the body data model 8 with a plurality of reference body poses 11 previously stored in the database 10. When there is sufficient correspondence with a reference body pose 11, the comparator unit 9 extracts information about the assigned actuator and the assigned setting and transmits it to an activation unit 12.

In order to assess the correspondence, a neuronal network, in particular trained with a plurality of reference body poses 11, 11', 11", may be used. This neuronal network may be previously trained, for example with reference body poses of different persons.

The activation unit 12 subsequently activates the concerning actuators with the concerning settings. In the specific exemplary embodiment, the activation unit 12 causes the electrical servo motor 2 of the seat to be activated in order to move the seat 3 backwards and, simultaneously, to increase the triggering power of an airbag 4 and to increase the brightness of a display device 5 on the dashboard of the vehicle 1 as well.

The invention is not limited to the described exemplary embodiments, but also comprises further embodiments of the present invention within the scope of the following patent claims.

LIST OF REFERENCE SIGNS 1 vehicle
2 servo motor
3 seat
4 airbag
5 display device
6 image capturing unit
7 data processing unit
8 body data model
9 comparator unit
10 database
11 reference body pose
12 activation unit
13 line of vision
14 face data model
15 reference body image

The invention claimed is:
1. A method for adjusting or controlling at least one vehicle component of a vehicle, comprising:
capturing an image or a video of a sitting person in the vehicle through an image capturing unit in 2D or 3D arranged in the vehicle,
extracting body data of the person through a data processing unit arranged in the vehicle and generation of a body data model from the body data through a data processing unit, wherein body data indicative of a plurality of defined key points of the body, the plurality of defined key points of the body are of at least one of: wrist joints, arm joints, sternum, shoulder joints, knee joints, elbow joints, hip joints, and head centre points,
by a software module in a memory of the data processing unit accessing a database to obtain a plurality of reference body poses, comparing them to the body data model and select a corresponding reference body pose accordingly, wherein the plurality of reference body poses are indicative of a determined arrangements and positions of a plurality of defined key points of the body and their spatial positions in relation to each other,
activating at least one vehicle actuator assigned to the selected reference body pose with a setting of the actuator assigned to the selected reference body pose through an activation unit for adjusting or controlling the at least one vehicle component of the vehicle, wherein the at least one vehicle actuator is in the vehicle and the body data model is generated in form of a table with two-dimensional coordinates of key points of the body or in form of graphs with connecting lines in between the detected key points in the data processing unit, wherein the comparison of the body data model with the reference body poses and the selection of a corresponding reference body pose is carried out by the software module in a memory of the data processing unit which applies a matching algorithm or a machine learning classification method.

2. The method according to claim 1, wherein a plurality of defined reference body poses are previously saved in a database, wherein each reference body pose is linked to at least one actuator and at least one setting of this actuator.

3. The method according to claim 2, wherein a reference body pose is combined with a plurality of actuators, wherein a defined setting is provided for each actuator.

4. The method according to claim 1, wherein the activation unit assesses the current setting of the actuator before activating the actuator.

5. The method according to claim 1, wherein the data processing unit generates a face data model from which the line of vision or the head orientation of the person are extracted, and the detected line of vision or head orientation
is taken into account by the data processing unit in the selection of the reference body pose and/or
is taken into account by the activation unit in the activation of the actuator.

6. The method according to claim 1, wherein the comparison of the body data model with the reference body poses and the selection of a corresponding reference body pose is carried out by the software module in a memory of the data processing unit
determining spatial body parameters of the body data model, the at least one of the spatial body parameters are selected from a group consisting of: a shoulder width, a torso length and an arrangement of the person's shoulder joints, upper arms, and lower arms and pelvis, and
applying predetermined heuristics in order to select one of the reference body poses, wherein at least one of the reference body poses is an angle between detected upper arms and lower arms of the person.

7. The method according to claim 1, wherein the body data refer to at least positions of defined key points, such as wrist joints, arm joints, sternum, shoulder joints, knee joints, elbow joints, hip joints, or head center points, as well as measurements between these positions, such as shoulder width, pelvis width, neck length, upper arm length, lower arm length, thigh length and the like.

8. A non-transitory computer-readable storage medium, comprising instructions which cause a data processing unit to perform a method according to claim 1.

9. A device configured for adjusting or controlling at least one actuator, in a vehicle, comprising:
an image capturing unit in 2D or 3D arranged in the vehicle, which is designed to capture an image or a video of a sitting person in the vehicle (1),
a data processing unit that is designed to extract the body data of the person and to generate a body data model from the body data, wherein body data indicative of a plurality of defined key points of the body, the plurality of defined key points of the body are of at least one of: wrist joints, arm joints, sternum, shoulder joints, knee joints, elbow joints, hip joints, and head centre points,
a software module in a memory of the data processing unit is designed to compare the body data model with a plurality of reference body poses obtained from a database and to select a corresponding reference body pose,
a software module in a memory of the data processing unit accessing a database to obtain a plurality of reference body poses, comparing them to the body data model and select a corresponding reference body pose accordingly, wherein the plurality of reference body poses are indicative of a determined arrangements and positions of a plurality of defined key points of the body and their spatial positions in relation to each other,
an activation unit configured to activate an actuator assigned to the selected reference body pose with a setting of the actuator assigned to the selected reference body pose for adjusting or controlling the at least one vehicle component of the vehicle, wherein the at least one vehicle actuator is in the vehicle,
wherein the data processing unit is designed to generate the body data model in form of a table with two-dimensional coordinates of key points of the body or in form of graphs with connecting lines in between the detected key points, wherein the data processing unit is designed to apply a matching algorithm or a machine learning classification method, in order to compare the body data model to the reference body poses and in order to select a corresponding reference body pose.

10. The device according to claim 9, wherein the data processing unit is designed to generate a face data model from which the line of vision or the head orientation of the person are extracted, and to take into account the detected line of vision or the head orientation when selecting the reference body pose, and/or the activation unit is designed to take into account the detected line of vision or the head orientation when activating the actuator.

11. The device according to claim 9, wherein the classification method is part of the data processing unit.

12. The device according to claim 9, wherein the data processing unit is designed to determine spatial body parameters of the body data model when comparing the body data model with the body reference body poses and when selecting a corresponding reference body pose selected from a group consisting of a shoulder width, a torso length and arrangement of shoulder joints, upper arms, lower arms and a pelvis of the person; wherein the data processing unit is further designed to apply predetermined heuristics in order to select one of the reference body poses, wherein at least one of the reference body poses is an angle between the detected upper arms and lower arms of the person.

13. The device according to claim 9, wherein the device is arranged entirely in a vehicle.

14. The method according to claim 1, wherein the actuator is selected from a group consisting of: an electrical servo motor for a seat, a tripping mechanism of an airbag, and a display device in the vehicle.

15. The device according to claim 8, wherein the actuator is selected from a group consisting of: an electrical servo motor for a seat, a tripping mechanism of an airbag, and a display device in the vehicle.

16. The method according to claim 1, wherein the learning classification method is a neural network trained with reference body images.

17. The device according to claim 8, wherein the learning classification method is a neural network trained with reference body images.

* * * * *